No. 885,398. PATENTED APR. 21, 1908.
E. J. SWEETLAND.
FILTER.
APPLICATION FILED JULY 9, 1907.
2 SHEETS—SHEET 1.
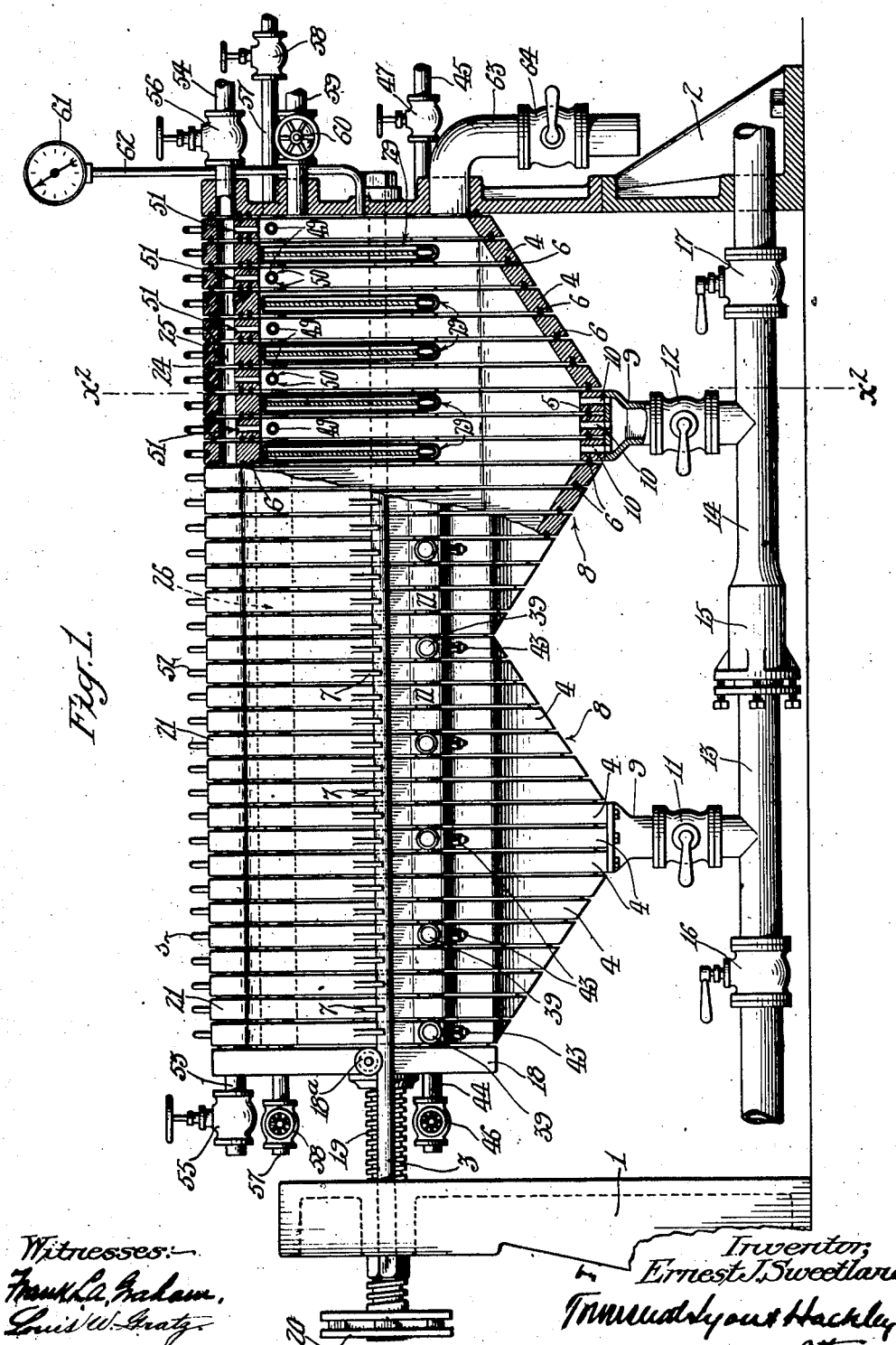

No. 885,398.  
PATENTED APR. 21, 1908.  
E. J. SWEETLAND.  
FILTER.  
APPLICATION FILED JULY 9, 1907.  
2 SHEETS—SHEET 2.
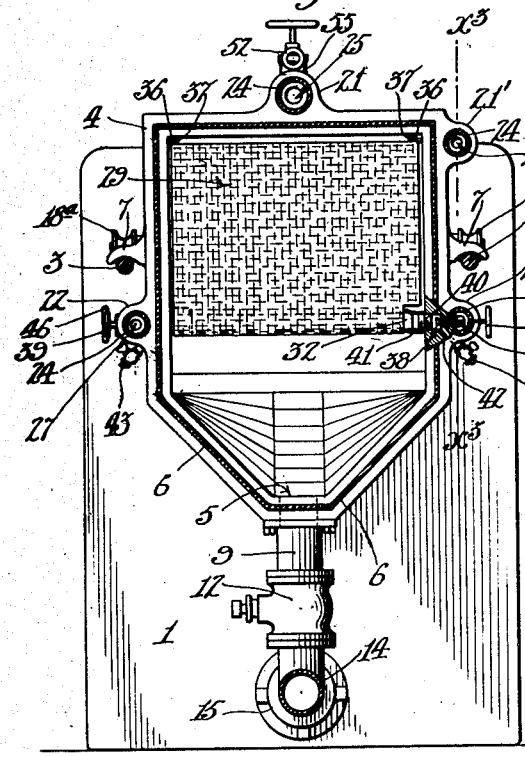
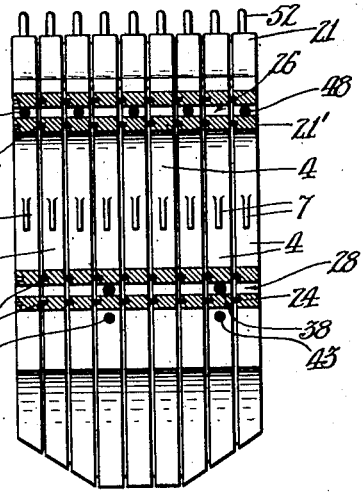
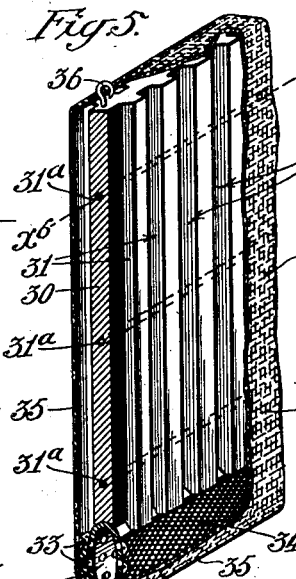
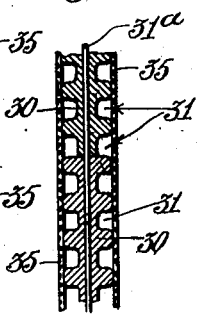
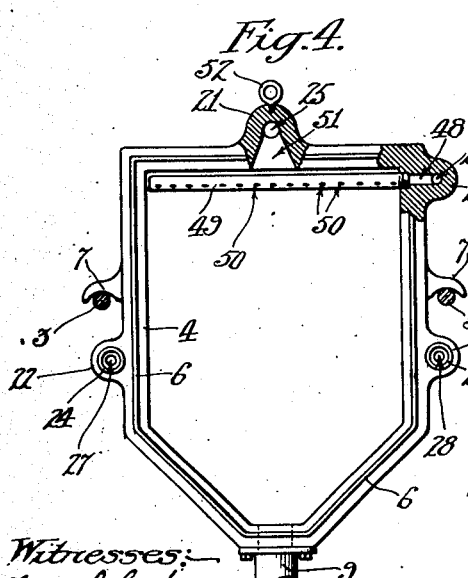
Witnesses:  
Inventor,  
Ernest J. Sweetland.

UNITED STATES PATENT OFFICE.

ERNEST J. SWEETLAND, OF GOLDFIELD, NEVADA.

FILTER.

No. 885,398.  Specification of Letters Patent.  Patented April 21, 1908.

Application filed July 9, 1907. Serial No. 382,961.

*To all whom it may concern:*

Be it known that I, ERNEST J. SWEETLAND, a citizen of the United States, residing at Goldfield, county of Esmeralda, State of Nevada, have invented a new and useful Filter, of which the following is a specification.

This invention relates to filters designed for the filtration of any liquid where a large volume is to be handled, such as in the filtration of a supply of water, for a city, but is more especially designed for the separation of slimes and solution in the treatment of ores by the cyanid process.

In the filtration of water for domestic purposes where it is necessary to filter through some medium, such as fullers' earth, charcoal, etc., the machine is so designed that this can be accomplished without difficulty. In the treatment of ores by the cyanid process it is customary to separate the tailings into two products for treatment, the sands and the slimes. The slimes are treated by agitation in vats with cyanid solution, and when the values have been dissolved by agitation with cyanid, the next step is to separate the solution from the residues from which the values have been dissolved, and it is for that separation that this machine is particularly designed. This slime is in such an extremely fine state of division that it is impossible to percolate any liquid through it at an economical rate without the assistance of either a vacuum or pressure. The vacuum filters now in use have the disadvantage that the acceleration is limited to the pressure of the atmosphere, while in a pressure filter, under which head this invention occurs, there is no limit to the amount of force that can be used for hastening the operation.

In using the term slimes throughout this specification I refer to ore in a state of extremely fine division mixed with liquid, forming a thin mud, or sludge.

One object of the invention is to provide a maximum filtering area, whereby filtration can be accelerated by pressure, and enabling the use of both vacuum and pressure, if desired.

Another object is to admit the slimes at the top of the filter devices which prevents the tendency of the slimes to become more dense at the bottom than at the top, as practice has shown that the natural tendency of the slimes is to settle or become more dense at the bottom when admitted to the receptacle from the bottom.

Another object is to provide for discharging the residue from the filter without manual labor and by the simple manipulation of valves and without excessive waste of water.

Another object is to provide for depositing the residue at any convenient point, even at a distance from the filter, without additional labor.

Another object is to so construct the filter that all of its parts are easily accessible and whereby leaks may be promptly located and repaired.

Another object is to construct the filter in units thereby enabling its size to be varied according to requirements.

Another object is to dispense with employing water in discharging the residue from the filter.

During the filtration process the residue forms as a cake on the filter devices, and another object is to cause this cake to form with an even density throughout regardless of its thickness, thereby promoting the ease with which the cakes are removed from the filter devices and insuring that when wash water is applied the cakes will be accurately and evenly washed in all parts and the dissolved values contained will thus be removed with a minimum amount of washing solution.

The accompanying drawings illustrate the invention, and referring thereto:—Figure 1 is a side elevation of a filter with a portion at the right side broken away. Fig. 2 is a section on line $x^2$—$x^2$ Fig. 1. Fig. 3 is a section on line $x^3$—$x^3$ Fig. 2. Fig. 4 is a front elevation of one of the frames shown partly in section. Fig. 5 is a perspective view partly in section and with the canvas cover broken away to show the detail construction of a filter device. Fig. 6 is a view on line $x^6$—$x^6$ Fig. 5. Fig. 7 is a view similar to Fig. 4, showing a modified form of frame.

1 and 2 designate the main standards which are secured to the foundation and are connected with each other by a pair of tie rods 3. Supported on the tie rods 3 is a series of frames 4, each frame, as shown in Figs. 2 and 4, comprising an upward rectangular portion terminating at the bottom with an inclined portion or wedge shaped frame having a straight portion 5. Each frame 4 on one side is provided with a groove, and gaskets 6 are laid in the grooves to seal the joints between the frames, as clearly shown in Fig. 1. Each frame 4 is provided with a pair of lugs 7 which rest upon the two tie rods 3, and all of the frames are thus supported in a vertical position parallel with each other. The frames 4 are not all of equal length but are graduated in length so that when assembled they will form, as shown in Fig. 1, a bottom having two hoppers 8. It is obvious that the number of frames could be increased or diminished to form more or less hoppers 8, according as it may be desired to increase or diminish the capacity of the filter. The three longest frames 4 at the center of each hopper 8 are of the same length, as shown in Fig. 1, thus forming a flat surface for the attachment of a pipe 9, the upper end of which is flared and bolted to the bottom of the frames 4. Each pipe 9 has communication with its adjacent hopper 8 through passages 10 which are formed in the bottom of the associated frames 4, as shown at the right in Fig. 1. Valves 11 and 12 are provided in the respective pipes 9. The valves 11 and 12 connect at the bottom with a horizontal pipe comprising two sections 13 and 14 which are united by expansion joints 15, the section 13 having a valve 16 and the section 14 having a valve 17.

As shown in Fig. 1, at the right, the gasket 6 lies in a groove in the standard 2, while at the extreme left a head 18 receives a similar gasket. The head 18 has a pair of rollers 18ª which rest upon the tie rods 3, and the head is thus supported in common with the frames 4, and all of the frames are held tightly compressed together by means of a screw 19 which is threaded in the standard 1 and has a wheel 20 on its outer end for turning it to produce the requisite pressure. Each frame 4 is provided with an ear 21 at the top, an ear 21' at one corner, and ears 22 and 23 at an intermediate point on the vertical bars of frame 4. Each of said ears has a central hole and annular grooves and gaskets 24 concentric with the holes which fit together similar to the gaskets 6 of the frames, and there are thus formed four longitudinal conduits, each being designated in general 25, 26, 27 and 28. Suspended in a vertical position in each intermediate frame 4 is a filter device designated in general 29, and shown in detail in Figs. 5, 6 and 8. Each filter device preferably comprises a number of strips of wood or thin boards 30 having a series of vertical longitudinal grooves 31, the boards being tied together edge to edge by a number of bolts 31ª, and a pipe 32 extends along the bottom of the boards 30, the pipe 32 being provided with a series of perforations 33. The lower edges of boards 30 are formed with a concave recess to receive the upper portion of the pipe 32, and that portion of the pipe 32 which lies below the boards 30 is covered with a wire screen 34, the object of which is to facilitate the passage of the filtrate into the pipe 32. Canvas 35 extends around the block and over the wire screen 34, and is firmly sewed all around the edges of the slab formed by the corrugated boards so that no liquid can pass from the main chamber of the filter into the pipe 32 without first passing through the canvas. Hooks 36 are attached to the upper end of the slab formed by the boards 30 and engage hooked shaped lugs 37 which are cast integral with each frame 4 at each upper corner thereof. A valve chamber 38 is formed in the frame 4, as shown in Fig. 2, and communicates with the conduit 28, and a valve 39 is provided for closing communication between the conduit 28 and pipe 32. A nipple 40 is screwed in the valve chamber 38 and a piece of flexible tubing 41 connects the nipple 40 with the adjacent end of the pipe 32. The flexible tube 41 permits the lower end of the filter device 29 to swing slightly, for a purpose hereinafter described. Communicating with the valve chamber 38 is a drain port 42 which is provided with a test-cock 43. By providing a test-cock on each frame which carries a filter device it is possible, by drawing a glass of the liquid from each filter device through the test-cock, to easily ascertain if any of the filter devices are leaking and to locate the particular one which is leaking. Without this means it would be necessary to take the entire machine apart to discover which filter device was at fault, and if the leak were small it would even then be very difficult to locate the trouble. The valve 39 is kept closed until it is found convenient to replace the faulty filter device, and this prevents the admission of any turbid liquid to the filtrate from the other filter devices. With this provision, however, the removal of a faulty filter device and its replacement by a new one is easily accomplished all that is necessary being to slack off the screw 19, disconnect the flanged pipes 9, and by means of a block and tackle remove the particular frame which carries the leaking filter device. The test-cock 43 and associated valve chamber 38 and valves 39 are provided in alternate frames 4, thus as shown in Fig. 1, there is a test-cock on the nearest side of every fifth frame, while on the other side of the machine there are also test-cocks on every fifth frame, each of which frames are midway between each two test-cocks on the nearest side shown. Communicating with the conduits 27 and 28, on each side of the machine, are pipes 44 and 45 provided respectively with valves 46 and 47.

The frames 4 which are intermediate the frames carrying the filter devices are provided, as shown in Fig. 4, with a port 48 which communicates with the conduit 26, and a pipe 49 is screwed to the frame and communicates with the port 48, each pipe 49 being provided with two or more rows of perforations 50, as shown in Fig. 1, which are adapted to discharge wash water against the two adjacent surfaces of the two filter devices between which that frame lies. Each of these frames 4, as shown in Fig. 4, is also provided with a flaring port 51 which communicates with the conduit 25 in the top ear 21, and is adapted to discharge wash water therethrough in addition to that discharged by the pipe 49, if necessary. But it should be understood that the main object of this conduit and its parts is for the admission of the turbid liquid to be filtered to the main chamber. The ear 21 of each frame 4 is provided with an eye 52 by means of which the frame may be lifted. Pipes 53 and 54 communicate at their respective ends with the conduit 25, the pipes 53 and 54 being respectively provided with valves 55 and 56. Pipes 57 communicate with the ends of conduit 26, the pipes 57 being provided with valves 58. A pipe 59 is screwed to the frame 2 and communicates with the interior of the filter chamber for the admission of air into the chamber or for special purposes and is provided with a valve 60. A pressure gage 61 is connected by a pipe 62 with the filter chamber. A pipe 63 communicates with the filter chamber at the lower portion thereof, as shown in Fig. 1, and is provided with a valve 64.

The slimes having been duly agitated are forced in to the filtering chamber through pipes 13 and 14 past valves 11 and 12 to fill the filter chamber and expel the air therefrom, the air escaping during this operation past the valve 55 which has been opened. As soon as the liquid appears at valve 55, showing that all air has been expelled, the valve is closed, and the pump continues to operate. As soon as the air is expelled, it is advisable to admit the slimes through the pipe 54. As there is no way for the liquid to escape except through the pores of the filter devices 29, the clear liquid passes into the pipes 32 of the filter devices filtering through the canvas 35 and flowing down through grooves 31 and through perforations 33 into the pipes 32, the clear liquid passing from all of the pipes 32 into the conduits 27 and 28, valves 39 being opened and clear liquid being conveyed from these conduits by pipes 44 and 45. The solid matter contained in the slimes is deposited in the form of a cake on the surface of the canvas of the filtering devices 29. In pumping the slimes into the filtering chamber from the bottom it has been found by experience that the liquid becomes more dense toward the bottom of the chamber than at the top, making a tendency for the cake to form thicker toward the bottom than at the top. To overcome this difficulty the pipes 53 and 54 have been provided which connect with the conduit 28. When the filtering chamber is filled, valves 11 and 12 are closed and the slimes are admitted through pipe 54 and pass into the conduit 25 and are introduced into the filtering chamber through the ports 51, whereby the slimes enter between each pair of filter devices 29.

Should a cake, in building up, become thicker in some parts, than in other parts, the thicker parts being more dense will retard filtration through them and the filtration will proceed at a more rapid rate through the thinner portions and thus deposit more residue on the thin portions and build them up even with the thicker portions, and thus an even thickness and density of the cake is automatically maintained.

As the pump continues operation, the slime cakes increase in thickness on the canvas of the filter devices until they are an inch or an inch and a half in thickness. The thickness being regulated by the density of the residues deposited on the canvas, the thickness of which is judged by the pressure indicated by the gage. Then the valves 11 and 12 are opened and the pump having been stopped the liquid is allowed to run out of the chamber through valves 11 and 12 into pipes 13 and 14, valve 16 having been closed to permit all of the liquid to flow out past valve 17. If desired this operation can be hastened by admitting compressed air through pipes 53 and 54. It will be understood that these slime cakes are heavy, and, as they adhere to the canvas of the filtering devices in a vertical position, their natural tendency is to fall off during this operation if some force did not hold them there. They may be held there in two ways; first, by the admission of compressed air through pipe 53 which would form a pressure in the chamber. But the preferable way is to connect pipe 45 with a vacuum pump and maintain a vacuum of four or five inches during the time the slimes are running out. After the slimes have been removed the next step is to remove from the slime cakes the dissolved values which are contained therein. It will be understood that the cyanid solution which so far has been filtered from the slimes carries, as a rule, several dollars per ton in dissolved values, and therefore the moisture which at this time is contained in the cakes also contains gold in the same amount. To recover these values it is customary to wash these slimes by displacement. This is accomplished by opening valve 55 and admitting wash water through the pipes 13, 14 and pipes 9 into the chamber, and as soon as the water appears at the valve 55, showing that the chamber is filled, this valve is closed while the pump continues to operate, pumping the wash water into the chamber through valves 11 and 12. As the wash water has no means of escape from the chamber, and the pump continues in operation, the wash water passes through the slime cakes into the inner chambers of the filter devices and through the perforations 33 into the pipes 32 and out through pipes 44 and 45. This operation is continued until tests made on the effluent solution show that the values have all been removed from the slime cakes, and the next step is to draw off the remaining wash water through the valves 11 and 12 and return it to the receptacle from which it came.

As soon as the chamber is empty of wash water and under no pressure, no vacuum being maintained through pipe 45, the natural tendency of the cakes is to fall off from the filter devices. As this action of them would be very slow and uncertain it is preferable to insure their prompt removal by admitting water or air under pressure through pipe 45 which is in direct communication with the interior of half of the filter devices. This pressure then causes the cakes to drop into the hoppers 8 which form the bottom of the chamber, and the cakes lie therein in the form of a thick mud about seventy per cent. solid. The filter devices being flexibly connected with the conduit 28 allows them a slight swinging motion as the cakes fall off, and the cakes are thus prevented from becoming wedged between the filter devices, which would be the case if the filter devices were rigidly connected. The valve 11 is then opened and valve 17 closed, and compressed air is admitted to the chamber through pipe 54 which forces the mud in the left hand hopper 8 out through the valve 11 into the pipe 13 and out past the valve 16. When left hand hopper 8 has been emptied valve 11 is closed and valve 12 is opened, and as the chamber is still under air pressure the mud in the right hand hopper 8 is forced out through valve 12 and through pipe 14 to any convenient point. The filter is then in condition to be refilled with slimes and the entire operation repeated. Note that this operation has discharged the residues from only half of the blankets, and must be repeated, admitting air through pipe 44 to disengage the cakes on the blankets connected to this conduit, it being understood that these were held in place by vacuum while the others were discharged. The object of this is to avoid overcrowding the hoppers with mud. In case the cakes are thin all of the blankets may be discharged at once by admitting air or water through pipes 44 and 45 simultaneously.

While the process described has been the filtering of slimes, it should be understood that the machine may be employed for filtering other liquids, for example, the juice in a sugar factory or the water supply for a city, in which latter case, a suitable amount of filtering material, for example, fullers' earth, clay or carbon may be placed in the main chamber and caused to form in cakes on the filtering devices, and after the cakes have formed and the water to be filtered is passed through the machine it is filtered from all solids, obnoxious gases, or deleterious substances. At intervals the cakes of filtering material which in use have accumulated the impurities from the water may be discharged from the filter device similarly to the manner in which the slime cakes are discharged, and the filtering cakes may again be reformed of fresh material.

By the arrangement of the filter blankets in alternate frames 4 it is possible to discharge the residue from half the filter blankets at a time, and enable the hoppers to be made smaller than would be necessary if all were discharged at once. Under certain conditions it is advisable to drop the cakes from the filter device before the chamber is emptied of wash water. In that case the mud dropping from the filter devices goes to the bottom of the hoppers, while the wash water which remains at the top of the chamber is recovered by opening valve 64 through which it is allowed to return to its receptacle.

If it is desired to filter constantly any liquid, such as the supply of water for a city, or in any case where constant filtration is necessary and the intermittent discharging of the filter would interfere with the operation, it can be done as follows: The chamber being already filled and the air having been expelled, the pump is kept running until the pressure on the gage 61 shows that it is pumping against considerable resistance which indicates that cakes of considerable thickness has been formed. By now applying water under a pressure greater than is indicated by the pressure gage through the conduit 27, the result is to cause the cakes on the filter devices connected with the conduit 27 to fall into the hoppers. As soon as pressure is removed from conduit 27 filtration again continues as before. Then water under pressure is admitted to the conduit 28 which causes the cakes on the filter devices connected with conduit 28 to fall as before. When operating under such conditions the valves 11 and 12 would be left slightly open, so that the sediment in the bottom of the press would be continually discharged by the hydraulic pressure on the interior of the chamber. This method of constant filtration would not be used when it was advisable to use fullers' earth or other material as a filtering medium in addition to the canvas.

The object of providing the pipes 49 is to afford means for simultaneously washing all of the filter blankets free from any material of sticky nature which may have adhered thereto, not having dropped off with the slime cakes.

What I claim is:—

1. In a filter, a chamber comprising a series of frames held together and graduated in length to form a hopper in the bottom of the chamber, and filtering means in the chamber.

2. In a filter, a chamber comprising a series of frames each having a rectangular upper portion and wedge shaped lower portion, means for holding the frames closely together, the frames being graduated in length with their upper ends in line to form a plurality of hoppers in the bottom of the chamber, and filtering means in the chamber.

3. In a filter, a chamber comprising a series of frames each having a rectangular upper portion and wedge shaped lower portion, means for holding the frames closely together, the frames being graduated in length with their upper ends in line and forming a hopper in the bottom of the chamber, and filtering means in the chamber.

4. In a filter, a laminated chamber comprising a series of frames held together, each frame having a plurality of hollow ears, each ear having a passageway to the inside of the frame, thereby forming a plurality of conduits along the chamber which have communication with the chamber, filtering means inside the chamber, and test-cocks in certain ears communicating with the interior of the ears.

5. In a filter, a laminated chamber comprising a series of frames held together, each frame having a plurality of hollow ears, certain ears having passageways to the inside of the frame, thereby forming a plurality of conduits along the chamber which have communication with the chamber, a plurality of filtering devices in the chamber, each filtering device being supported by a frame, a connection from the passageway of the frame to the filter, and a valve for shutting off communication of the filter with the hollow ear and conduit associated therewith.

6. In a filter, a laminated chamber comprising a series of frames held together, each frame having a plurality of hollow ears, certain ears having passageways to the inside of the frame, thereby forming a plurality of conduits along the chamber which have communication with the chamber, a plurality of filtering devices in the chamber, each filtering device being supported by a frame, a connection from the passageway of the frame to the filter, and a valve for shutting off communication of the filter with the hollow ear and conduit associated therewith, the top ears of certain frames having a flaring port communicating with the interior of the chamber.

7. In a filter, a laminated chamber comprising a series of frames held together, each frame having a plurality of hollow ears, certain ears having passageways to the inside of the frame, thereby forming a plurality of conduits along the chamber which have communication with the chamber, a plurality of filtering devices in the chamber, each filtering device being supported by a frame, a connection from the passageway of the frame to the filter, a valve for shutting off communication of the filter with the hollow ear and conduit associated therewith, the top ears of certain frames having a flaring port communicating with the interior of the chamber, and perforated pipes in the latter frames communicating with a side conduit.

8. In a filter, a chamber comprising a series of frames each having a rectangular upper portion and wedge shaped lower portion, means for holding the frames closely together, the frames being graduated in length with their upper ends in line to form a plurality of hoppers in the bottom of the chamber, filtering means in the chamber, a pipe below the chamber comprising two sections united by an expansion joint, pipes from said respective sections to the respective hoppers, a valve in each of said latter pipes, and outer valves in each of said sections.

9. In a filter, a chamber comprising a series of frames held together and sealed at the joints, and filtering devices suspended from alternate frames.

10. In a filter, a chamber comprising a series of frames held together and sealed at the joints, and filtering devices suspended from alternate frames, conduits along both sides of the chamber, alternating filter devices being in communication with one conduit and the intervening filter devices being in communication with the other conduit.

11. In a filter, a chamber comprising a series of frames held together and sealed at the joints, and filtering devices suspended from alternate frames, a conduit along the side of the chamber and flexible connections between filter devices and the conduit permitting the filter devices to swing slightly.

12. In a filter, a chamber comprising a series of frames detachably held together and sealed at the joints, and pendent filter devices in the chamber detachably hung to the frames.

13. In a filter, a filter device comprising a plate with vertical corrugations, a perforated pipe along its lower edge, a wire screen over the pipe, and canvas over the plate, screen and pipe.

14. In a filter, a filter device comprising a plate formed of a plurality of boards arranged edge to edge and tied with bolts, the boards having vertical grooves and a concave recess in their lower edges, a perforated pipe seated in the recess, a wire screen around the pipe, and canvas around the boards, screen and pipe.

15. In a filter, a filter device comprising a plate formed of a plurality of boards arranged edge to edge and tied with bolts, the boards having vertical grooves and a concave recess in their lower edges, a perforated pipe seated in the recess, a wire screen around the pipe and canvas around the boards, screen and pipe, a chamber comprising a series of frames held closely together and sealed at the joints, each frame having a pair of lugs, and hooks on said boards engaging the lugs on the frames for supporting the filter devices.

16. In a filter, a filter device comprising a plate formed of a plurality of boards arranged edge to edge and tied with bolts, the boards having vertical grooves and a concave recess in their lower edges, a perforated pipe seated in the recess, a wire screen around the pipe and canvas around the plate, screen and pipe, a chamber comprising a series of frames held closely together and sealed at the joints, each frame having a pair of lugs, hooks on said boards engaging the lugs on the frames for supporting the filter devices, hollow ears on the frames, each hollow ear having a passage, a nipple in the passage, and a flexible tube connecting each nipple with the pipe of the associated filter device.

17. In a filter, a filter device comprising a plate formed of a plurality of boards arranged edge to edge and tied with bolts, the boards having vertical grooves and a concave recess in their lower edges, a perforated pipe seated in the recess, a wire screen around the pipe and canvas around the boards, screen and pipe, a chamber comprising a series of frames held closely together and sealed at the joints, each frame having a pair of lugs, hooks on said boards engaging the lugs on the frames for supporting the filter devices, hollow ears on the frames, each hollow ear having a passage, a nipple in the passage, a flexible tube connecting each nipple with the pipe of the associated filter device, said hollow ears forming conduits, and a valve between each nipple and the associated hollow ear of the conduit.

18. In a filter, a laminated chamber comprising a series of frames, each frame having a hollow ear on each side, a hollow ear on an upper corner and a hollow ear on the top, said hollow ears forming four conduits, horizontal perforated pipes in alternate frames connecting with the associated corner ear, the top ears of the latter frames having downwardly flaring ports, a filter device hung from each of the latter frames, the side ears of the intervening frames having passages in communication with the filter devices, and valves for controlling said passages.

19. In a filter, a chamber comprising a series of frames held together and sealed at the joints, filtering devices suspended from certain frames, conduits along both sides of the chamber, said filter devices being in communication with one conduit, and intervening filter devices in communication with the other conduit.

20. In a filter, a laminated chamber comprising a series of frames held together, each frame having a plurality of hollow ears, certain ears having passageways to the inside of the frame, thereby forming a plurality of conduits along the chamber which have communication with the chamber, a plurality of filtering devices in the chamber, each filtering device being supported by a frame, and a connection from the passageway of the frame to the filter.

21. In a container for filters the body of which comprises a series of frames held together to form a continuous chamber, said frames having alining openings which form a conduit along said chamber, and a plurality of filters within said chamber communicating with the conduit.

22. A filter, the body whereof comprises a series of frames clamped together, to form a filtering chamber, filtering devices in the upper portion of said chamber, and an open longitudinal space through said chamber adapted to receive residues falling from said filter devices.

23. In a filter, a chamber comprising a series of frames arranged side by side, filtering means in the upper part of said chamber, and the lower space of the chamber being continuous and unobstructed by the filter means.

24. In a filter, a series of frames held together to form a single continuous chamber, and filtering means in the upper portion of the chamber leaving the lower portion unobstructed.

25. In a filter, a series of frames held together side by side to form a continuous chamber having laminated walls, and filter devices in the upper part of said chamber, the spaces between the filter devices being unobstructed and the space below the filter devices being unobstructed and in full communication with the filter devices.

26. A filter, the body whereof comprises a series of frames clamped together, each frame having a passageway through one of the walls thereof, said passageways alining to form a continuous conduit, filtering means in the upper portion of the chamber adapted to drain the filtrate into said conduit, and an open longitudinal space between said filtering means and the lower walls of the chamber.

In testimony whereof, I have hereunto set my hand at Los Angeles, California, this 2d day of July, 1907.

ERNEST J. SWEETLAND.

In presence of—
GEORGE T. HACKLEY,
FRANK L. A. GRAHAM.